(12) United States Patent
Beier et al.

(10) Patent No.: US 11,964,646 B2
(45) Date of Patent: Apr. 23, 2024

(54) FOOT BRAKE VALVE OF AN AIR BRAKE SYSTEM

(71) Applicant: ZF CV Systems Hannover GmbH, Hannover (DE)

(72) Inventors: Peter Beier, Wunstorf (DE); Ulrich Couppee, Coppenbrügge (DE); Reiner Hölscher, Seelze (DE); Gerhard Martini, Gehrden (DE); Karl-Heinz Riediger-Janisch, Hannover (DE); Olaf Bindseil, Hannover (DE); Petra Elze, Hannover (DE); Alexander Fabian, Peine (DE); Gerrit Glondajewski, Hannover (DE); Sven Homann, Wedemark (DE); Jan Hörstmann, Lehrte (DE); Thomas Müller, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 456 days.

(21) Appl. No.: 17/287,131

(22) PCT Filed: Oct. 17, 2019

(86) PCT No.: PCT/EP2019/078187
§ 371 (c)(1),
(2) Date: Apr. 21, 2021

(87) PCT Pub. No.: WO2020/094354
PCT Pub. Date: May 14, 2020

(65) Prior Publication Data
US 2021/0323528 A1    Oct. 21, 2021

(30) Foreign Application Priority Data
Nov. 8, 2018   (DE) .................. 10 2018 127 907.8

(51) Int. Cl.
*B60T 15/04* (2006.01)
*B60T 7/06* (2006.01)

(52) U.S. Cl.
CPC .............. *B60T 15/043* (2013.01); *B60T 7/06* (2013.01)

(58) Field of Classification Search
CPC ... B60T 7/04; B60T 7/06; B60T 15/04; B60T 15/043
See application file for complete search history.

(56) References Cited

U.S. PATENT DOCUMENTS 2,275,338 A * 3/1942 Andres ................. B60T 15/048
                                                                 303/54
3,003,825 A * 10/1961 Kemble ................ B60T 15/043
                                                                 267/152

(Continued)

FOREIGN PATENT DOCUMENTS

DE    2619775 B1    11/1977
DE    2937657 A1    4/1981
(Continued)

OTHER PUBLICATIONS

European Patent Office, Rijswijk, Netherlands, International Search Report of International Application No. PCT/EP2019/078187, dated Feb. 7, 2020, 2 pages.

(Continued)

*Primary Examiner* — Thomas W Irvin
(74) *Attorney, Agent, or Firm* — Dickinson Wright PLLC

(57) ABSTRACT

A foot brake valve (2') of a pneumatic brake system in a motor vehicle has an installation plate (4'), on which a brake pedal (14) is pivotably mounted and to which a housing (18') of a control unit (16, 26) is fastened. A spring-loaded plunger piston (36) in actuating contact with the brake pedal (14) is guided axially movably in an annular collar (50) projecting upward out of the installation plate (4'). For fastening the (Continued)

housing (18') of the control unit (16, 26) to the installation plate (4'), the housing (18') has an intermediate flange (48) which is screw-connected to the main part of the housing (18') and has the annular collar (50). The intermediate flange (48) is coaxially rotatably about a vertical central axis (32), and is connectable in non-positively locking fashion to the installation plate (4') via a releasable clamping connection (62).

16 Claims, 5 Drawing Sheets

(56) References Cited

U.S. PATENT DOCUMENTS

| | | | | |
|---|---|---|---|---|
| 4,161,341 | A * | 7/1979 | Reinecke | B60T 15/14 |
| | | | | 303/DIG. 10 |
| 4,193,641 | A * | 3/1980 | Reinecke | B60T 15/043 |
| | | | | 303/50 |
| 4,305,623 | A | 12/1981 | Seabase | |
| 4,819,992 | A * | 4/1989 | Angelillo | B60T 15/14 |
| | | | | 303/3 |
| 5,184,468 | A * | 2/1993 | Schonlau | B60T 13/567 |
| | | | | 91/369.1 |
| 5,395,164 | A * | 3/1995 | Sulzyc | B60T 15/14 |
| | | | | 303/14 |
| 6,866,346 | B2 * | 3/2005 | Leske | B60T 15/04 |
| | | | | 303/50 |
| 6,953,228 | B2 * | 10/2005 | Leske | B60T 15/043 |
| | | | | 303/50 |
| 2004/0026182 | A1 * | 2/2004 | Leske | B60T 15/043 |
| | | | | 188/72.1 |
| 2004/0045777 | A1 * | 3/2004 | Leske | B60T 15/04 |
| | | | | 188/152 |

FOREIGN PATENT DOCUMENTS

| | | | | |
|---|---|---|---|---|
| DE | 102013015973 | A1 | 3/2015 | |
| WO | WO-2016041753 | A1 * | 3/2016 | B60T 11/18 |

OTHER PUBLICATIONS

Document 815 010 003.3, Systems and Components for Commercial Vehicles, Edition 2, Chapter 1, "Components of the Motor Vehicle's Braking System," Section "Brake Valves" (see pp. 27 to 32), which is retrievable on the Internet at https://www.wabco-customercentre.com/catalog/docs/8150100033.pdf as a PDF file.

* cited by examiner

FOOT BRAKE VALVE OF AN AIR BRAKE SYSTEM

TECHNICAL FIELD

The invention relates to a foot brake valve of a pneumatic brake system in a motor vehicle, having an installation plate on which a brake pedal is pivotably mounted and to which a housing of an electrical control unit and/or of a pneumatic control unit is fastened, wherein a spring-loaded plunger piston which is in actuating contact with the brake pedal is guided axially movably in an annular collar which projects upward out of the installation plate.

BACKGROUND

A foot brake valve of a pneumatic brake system has the function of setting the brake pressure in the normally two brake circuits of a motor vehicle and possibly of a trailer vehicle in a manner dependent on the actuation position of the brake pedal that is to be actuated by a driver. For this purpose, control pistons of the pneumatic control unit have an actuating connection, via an axially movably guided plunger, to the spring-loaded plunger piston, which is directly in actuating contact with the brake valve. The housing of the pneumatic control unit has two input ports and two output ports. In the installed state, a respective reservoir pressure line safeguarded by a multi-circuit protection valve is connected to each of the input ports. A brake pressure line of the respectively associated brake circuit is connected to each of the output ports. The input ports and the output ports of the pneumatic control unit are normally arranged on opposite sides of the housing. Embodiments of foot brake valves are however also known, in which the input ports and the output ports of the pneumatic control unit are arranged adjacent to one another on the same side of the housing.

Between an installation plate of the foot brake valve and the pneumatic control unit, an electrical control unit, via which, in a manner dependent on the actuation position of the brake pedal, the brake lamps of the motor vehicle and possibly of a trailer vehicle can be switched on and off and/or the braking force of a retarder can be metered. For the connection of electrical connecting cable, a plug socket is provided, which is normally arranged on a protruding pedestal on one side of the housing.

DE 26 19 775 C2 has disclosed a foot brake valve of a pneumatic brake system, in the case of which foot brake valve an electrical control unit for the stepped control of the braking force of a retarder is arranged between the installation plate and the pneumatic control unit.

By contrast, DE 10 2013 015 973 A1 describes a foot brake valve of a pneumatic brake system, in the case of which foot brake valve an electrical control unit for switching on and off the brake lamps of the motor vehicle and possibly of a trailer vehicle is arranged between the installation plate and the pneumatic control unit.

The construction and functioning of various embodiments of foot brake valves with and without an electrical control unit can be found in the document 815 010 003.3 SYSTEMS AND COMPONENTS FOR COMMERCIAL VEHICLES, Edition 2, chapter 1 "Components of the Motor Vehicle's Braking System", section "Brake Valves", (see pages 27 to 32), which is retrievable on the Internet at https://www.wabco-customercentre.com/catalog/docs/8150100033.pdf as a PDF file.

As is apparent from the cited documents, it is the case in the foot brake valves from WABCO GmbH, Hanover, that the housings of the pneumatic control unit and of the electrical control unit are respectively connected to one another and to the installation plate by a flange screw connection. Since both the connecting flanges and also the pattern of holes thereof are configured in a square and symmetrically with respect to the vertical central axis of the respective foot brake valve, the pneumatic control unit and the electrical control unit can also, independently of one another, be fastened to the installation plate in a position rotated through 90°, 180° or 270° about the vertical central axis in relation to a standard arrangement. In this way, the ports of the pneumatic control unit and the plug socket of the electrical control unit can, to a limited extent, be oriented in the manner which is most favorable for the installation of the foot brake valve in a particular motor vehicle.

SUMMARY

Since this possibility of adjusting the housings in 90° steps may however be insufficient in some applications, it was the object of the present invention to propose a foot brake valve of a pneumatic brake system of the type of construction mentioned in the introduction, in the case of which the housing of an electrical control unit and/or of a pneumatic control unit can be fastened to the installation plate in a manner rotated in continuously variable fashion, or at least with graduation finer than 90° steps, about the vertical central axis.

Accordingly, the invention relates to a foot brake valve of a pneumatic brake system in a motor vehicle, having an installation plate on which a brake pedal is pivotably mounted and to which a housing of an electrical control unit and/or of a pneumatic control unit is fastened, wherein a spring-loaded plunger piston which is in actuating contact with the brake pedal is guided axially movably in an annular collar which projects upward out of the installation plate.

In order to be able to fasten the housing of the pneumatic control unit and possibly of an electrical control unit to the installation plate in a manner rotated in continuously variable fashion, or at least with graduation finer than 90° steps, about the vertical central axis of the foot brake valve, it is provided that the housing of the control unit arranged directly beneath the installation plate has an intermediate flange which is screw-connected to the main part of the housing and which has the annular collar, and in that the intermediate flange is, with the annular collar, guided in a passage opening of the installation plate coaxially rotatably about a vertical central axis, and is connectable in non-positively locking fashion to the installation plate via a releasable clamping connection.

Owing to the expansion of the foot brake valve to include the intermediate flange and the clamping connection, it is thus made possible, with little additional outlay, to fasten the housing of the pneumatic control unit and possibly of the electrical control unit to the installation plate in a manner rotated about the vertical central axis such that the line ports of the pneumatic control unit for the connection of pneumatic lines, and possibly the plug socket of the electrical control unit for the connection of a connecting cable, are optimally oriented in the respective motor vehicle.

In a first design variant of the foot brake valve according to the invention, it is provided that the clamping connection is formed by an outer annular groove in the annular collar of the intermediate flange and by two clamping plates which are arranged at the annular collar diagonally oppositely on the installation plate and which engage into the annular groove, and that the clamping plates are screw-connected to the installation plate, are each angled upward in cross section radially at the inside, and in the installed state bear with a circular-arc-shaped inner end wall against the groove bottom of the annular groove and with their axially outer inner edge against the upper side wall of the annular groove. In this way, the intermediate flange is fastened in positively locking and non-positively locking fashion to the installation plate.

The inner end wall of the clamping plates and the groove bottom of the annular groove of the annular collar, at which the clamping plates and the annular collar of the intermediate flange are braced radially against one another, may each be of smooth form, whereby, when a screw connection of the clamping plates is loosened, continuously variable setting of the circumferential orientation of the housings of the control units relative to the installation plate is possible.

As an alternative to this, the inner end wall of the clamping plates and the bottom of the annular groove of the annular collar may however each also be of circumferentially toothed form, whereby increased security of the components against rotation is achieved and, when a screw connection of the clamping plates is loosened, setting of the circumferential orientation of the housings of the control units relative to the installation plate is possible with graduation corresponding to the toothing pitch.

In order to allow the most finely graduated setting of the circumferential orientation of the housings of the control units relative to the installation plate, the inner end wall of the clamping plates and the groove bottom of the annular groove of the annular collar are each preferably provided with a circumferential serration.

In a second design variant of the foot brake valve according to the invention, it is provided that the clamping connection is formed by a clamping screw connection which comprises the following: an annular collar on the top side of the installation plate with a cylindrical inner wall, a clamping ring with a cylindrical outer wall and with a conical, axially downwardly narrowing inner wall, and a conical outer wall on the annular collar of the intermediate flange, and also a sleeve nut with an internal thread, wherein the clamping ring is, in the installed state, arranged between the inner wall of the annular collar of the installation plate and the outer wall of the annular collar of the intermediate flange, and wherein radial bracing of the two annular collars is caused by the clamping ring as a result of the screw connection of the sleeve nut to the annular collar of the installation plate. In this way, the intermediate flange is fastened in positively locking and non-positively locking fashion to the installation plate.

It may furthermore be provided that the cylindrical inner wall of the annular collar of the installation plate, the conical inner wall and the cylindrical outer wall of the clamping ring, and the conical outer wall of the annular collar of the intermediate flange are each of smooth form. In this way, when a screw connection of the sleeve nut is loosened, continuously variable setting of the circumferential orientation of the housings of the control units relative to the installation plate is possible.

As an alternative to this, it may be provided that the cylindrical inner wall of the annular collar of the installation plate, the conical inner wall and the cylindrical outer wall of the clamping ring and the conical outer wall of the annular collar of the intermediate flange are each of circumferentially toothed form. In this way, increased security of the components against rotation is achieved and, when a screw connection of the sleeve nut is loosened, setting of the circumferential orientation of the housings of the control units relative to the installation plate is possible with graduation corresponding to the toothing pitch.

In order to allow the most finely graduated setting of the circumferential orientation of the housings of the control units relative to the installation plate, the cylindrical inner wall of the annular collar of the installation plate, the conical inner wall and the cylindrical outer wall of the clamping ring and the conical outer wall of the annular collar of the intermediate flange are each provided with a circumferential serration.

In another embodiment of the foot brake valve according to the invention, it is provided that the clamping connection is formed by a clamping screw connection which comprises the following: an annular collar on the top side of the installation plate with an external thread and with a conical, axially downwardly narrowing inner wall, a clamping ring with a conical, axially downwardly narrowing outer wall and with a cylindrical inner wall, a cylindrical outer wall on the annular collar of the intermediate flange, and a sleeve nut with an internal thread, and with an external thread on the annular collar of the intermediate flange and an internal thread on the inner wall of the clamping ring, wherein the internal thread of the clamping ring is, in the installed state, screw-connected to the external thread of the intermediate flange, and wherein radial bracing of the two annular collars is caused by the clamping ring as a result of the screw connection of the sleeve nut to the annular collar of the installation plate.

Here, it may be provided that the inner wall of the annular collar on the top side of the installation plate and the outer wall of the clamping ring are each of smooth form.

It is furthermore considered to be advantageous if the clamping ring at least of the immediately aforementioned embodiment is of axially slotted form or is composed of multiple ring segments. In this way, it is made easier for the clamping ring to be pushed coaxially into the clamping seat.

DETAILED DESCRIPTION OF THE DRAWINGS

Figure 3:
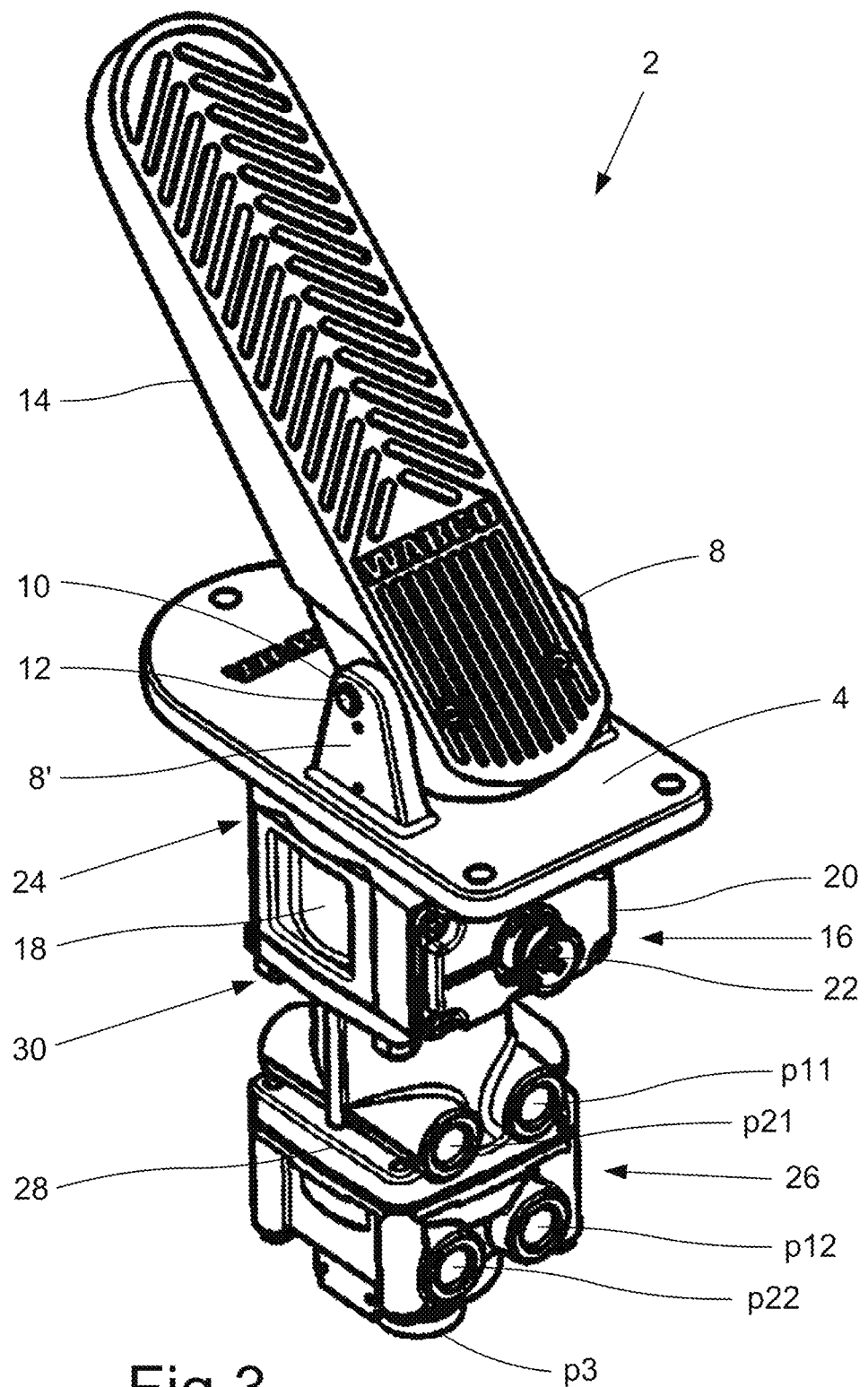
FIG. 3 shows a known foot brake valve of a pneumatic brake system in a perspective view.
Figure 3A:
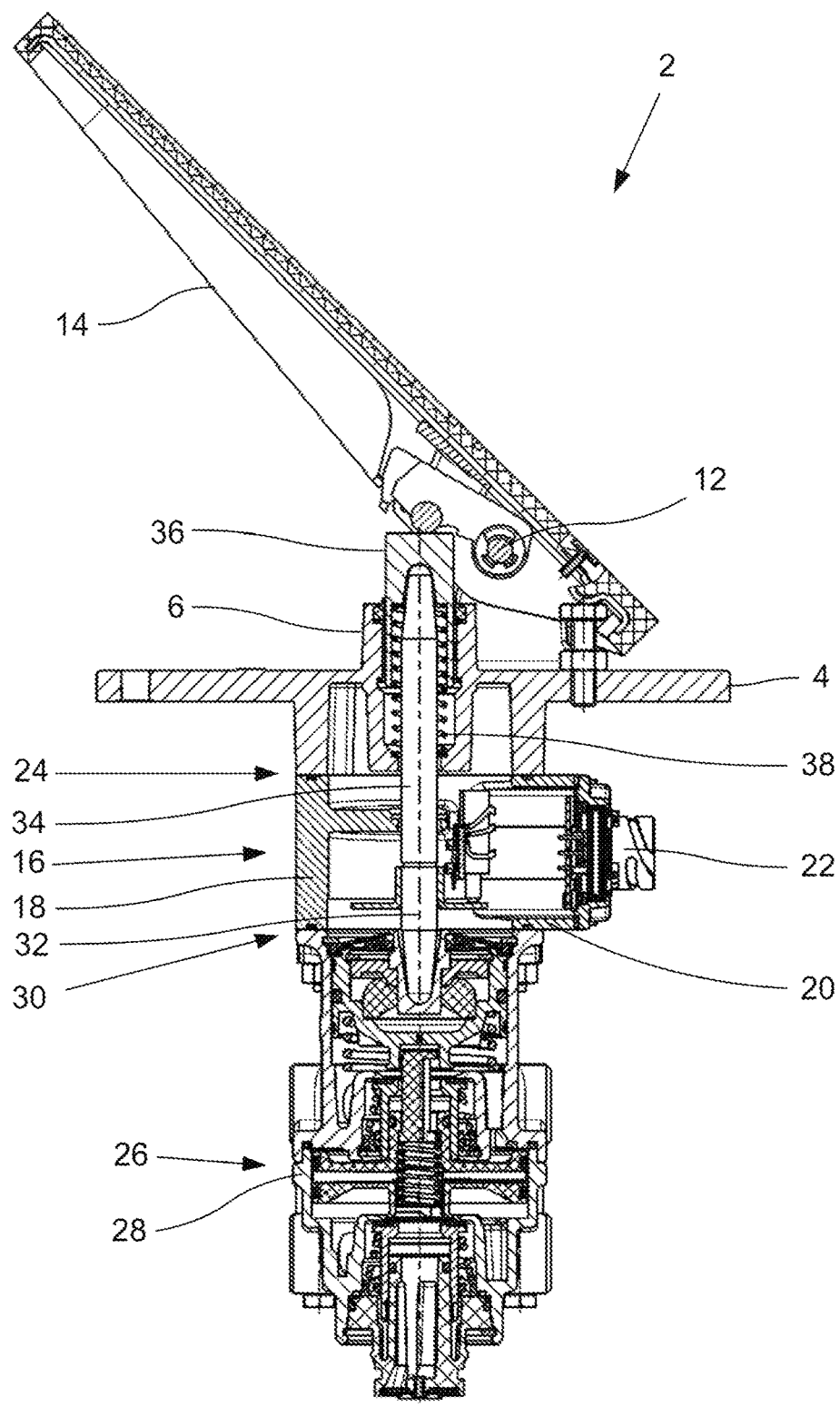
FIG. 3a shows the foot brake valve as per FIG. 3 in a longitudinal section.

A known foot brake valve 2, shown in a perspective view in FIG. 3 and in a longitudinal section in FIG. 3a, of a pneumatic brake system has an installation plate 4, with an annular collar 6 which projects out upwardly, and with two lugs 8, 8' which are arranged parallel to one another on the top side of the installation plate 4. Into each bearing bore 10 of the lugs 8, 8', a bearing journal 12 is inserted, on which a brake pedal 14 is pivotably mounted. Arranged on the bottom side of the installation plate 4 are the housing 18 of an electrical control unit 16 and the housing 28 of a pneumatic control unit 26, which are respectively connected via a flange screw connection 24, 30 to one another and to the installation plate 4. The control elements of the two control units 16, 26, such as electrical switches and pneumatic valves, have an actuation connection to an elongate plunger 34 which is guided so as to be axially movable coaxially with respect to a vertical central axis 32 of the housings 18, 28. At its upper end, the plunger 34 engages into a central bore of a plunger piston 36 which is guided, under the load of a compression spring 38 in the form of a helical spring, in axially movable fashion in the annular collar 6 of the installation plate 4 and which has a direct actuation connection to the brake pedal 14.

An actuation of the brake pedal 14 causes the plunger piston 36 and the plunger 34 to be pushed downward counter to the resetting force of the helical spring 38, whereby electrical contacts are successively closed in the electrical control unit 16, as a result of which the braking force of a retarder that is installed in the respective motor vehicle is increased in stepped fashion. For the transmission of the electrical switching signals, a plug socket 22 is provided which is mounted on a pedestal 20 on the rear side (as viewed in a forward direction of travel) of the housing 18, to which plug socket an electrical connecting cable which leads to a control unit or directly to the retarder can be connected.

In the pneumatic control unit 26, the actuation of the brake pedal and the resulting downward axial displacement of the plunger 34 causes the output ports p11, p22 of two brake circuits of the motor vehicle to each be shut off with respect to a ventilation output p3 and connected to an associated input port p11, p12, whereby the brake pressure prevailing at the output ports p21, p22 is continuously increased. In the present case, the input ports p11, p12, to each of which a reservoir pressure line safeguarded by a multi-circuit protection valve is connected in the installed state, and the output ports p21, p22, to each of which a brake pressure line of the associated brake circuit is connected in the installed state, are arranged adjacent to one another on the rear side of the housing 28.

The connecting flanges of the flange screw connections 24, 30 and also the pattern of holes thereof are configured in a square and symmetrically with respect to the vertical central axis 32 of the foot brake valve 2, such that the pneumatic control unit 26 and the electrical control unit 16 can also, independently of one another, be fastened to the installation plate 4 in a manner rotated through 90°, 180° or 270° about the vertical central axis 32 in relation to the standard arrangement shown. Since only a limited orientation of the input and output ports p11, p12, p21, p22 of the pneumatic control unit 26 and of the plug socket 22 of the electrical control unit 16 in relation to the conditions in a particular motor vehicle is possible in this way, it is the intention for the foot brake valve according to the invention to allow the housings 18, 28 of the two control units 16, 26 to be oriented in continuously variable fashion, or at least with finer graduation, with respect to the central axis 32.

Figure 1:
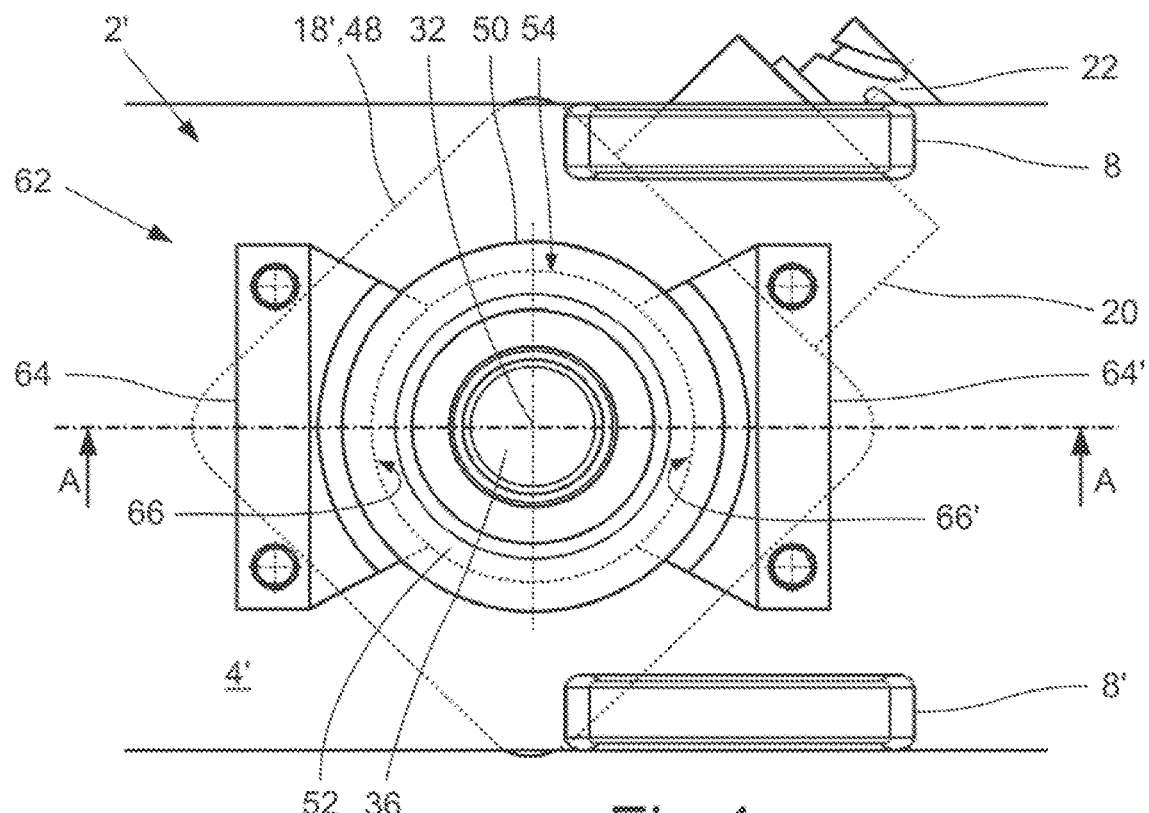
FIG. 1 shows a first embodiment of a foot brake valve according to the invention of a pneumatic brake system in a detail plan view.
Figure 1A:
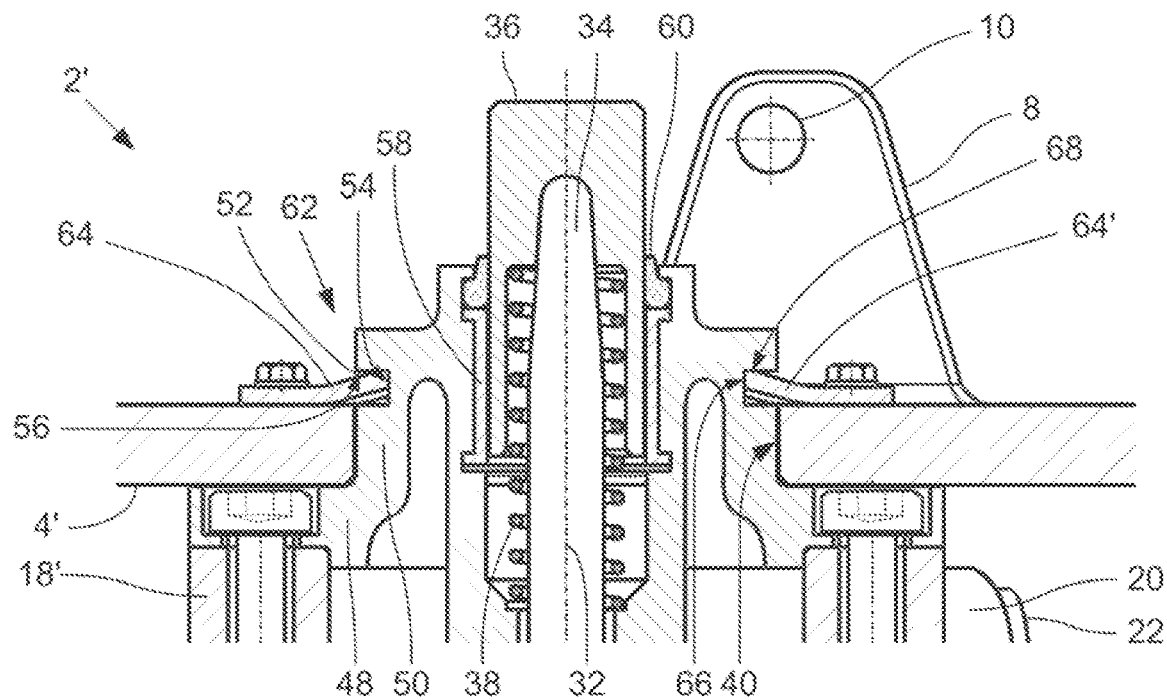
FIG. 1a shows the foot brake valve as per FIG. 1 in a detail longitudinal section.

In a first embodiment of a foot brake valve 2' according to the invention of a pneumatic brake system, as respectively shown in a detail in the plan view as per FIG. 1 and in the longitudinal section of FIG. 1a, which lies in the section plane A-A as per FIG. 1, the housing 18' of the electrical control unit 16 has an intermediate flange 48 which is screw-connected to the main part of the housing 18' via hexagonal-socket screws and which has an annular collar 50 in which the plunger piston 36 is guided in axially movable fashion. For low-friction and sealed guidance of the plunger piston 36, a plain bearing bushing 58 and a sealing ring 60 are inserted into the annular collar 50 of the intermediate flange 48. The intermediate flange 48 is, with the annular collar 50, guided rotatably about the vertical central axis 32 in a passage opening 40 of the installation plate 4' and is connectable in non-positively locking fashion to the installation plate 4' via a releasable clamping connection 62.

The clamping connection 62 is formed by a radially outer annular groove 52 in the annular collar 50 of the intermediate flange 48 and by two clamping plates 64, 64' which are arranged at the annular collar 50 diagonally oppositely on the installation plate 4' and which engage into the annular groove 52. The two clamping plates 64, 64' are screw-connected to the installation plate 4' and are each angled upward in cross section radially at the inside. In the installed state, the clamping plates 64, 64' each bear with a circular-arc-shaped inner end wall 66, 66' against the groove bottom 54 of the annular groove 52 and with their axially outer inner edge 68 against the upper side wall 56 of the annular groove 52, whereby the intermediate flange 48 is fastened in positively locking and non-positively locking fashion to the installation plate 4'.

The inner end wall 66 of the clamping plates 64, 64' and the groove bottom 54 of the annular groove 52 of the annular collar 50 may each optionally be of smooth form or, in particular by a serration, circumferentially toothed form. In this way, when the screw connection of the clamping plates 64, 64' is loosened, setting of the circumferential orientation of the housings 18', 28 of the control units 16, 26 relative to the installation plate 4' is possible either in continuously variable fashion or with graduation corresponding to the toothing pitch. In the images of FIGS. 1 and 1a, the housings 18', 28 of the control units 16, 26 have, by way of example, been fastened to the installation plate 4' in a manner rotated 45° counterclockwise with respect to the vertical central axis 32 proceeding from a standard setting in which the pneumatic ports p11, p12, p21, p22 and the plug socket 22 are oriented rearward (as viewed in a forward direction of travel).

Figure 2:
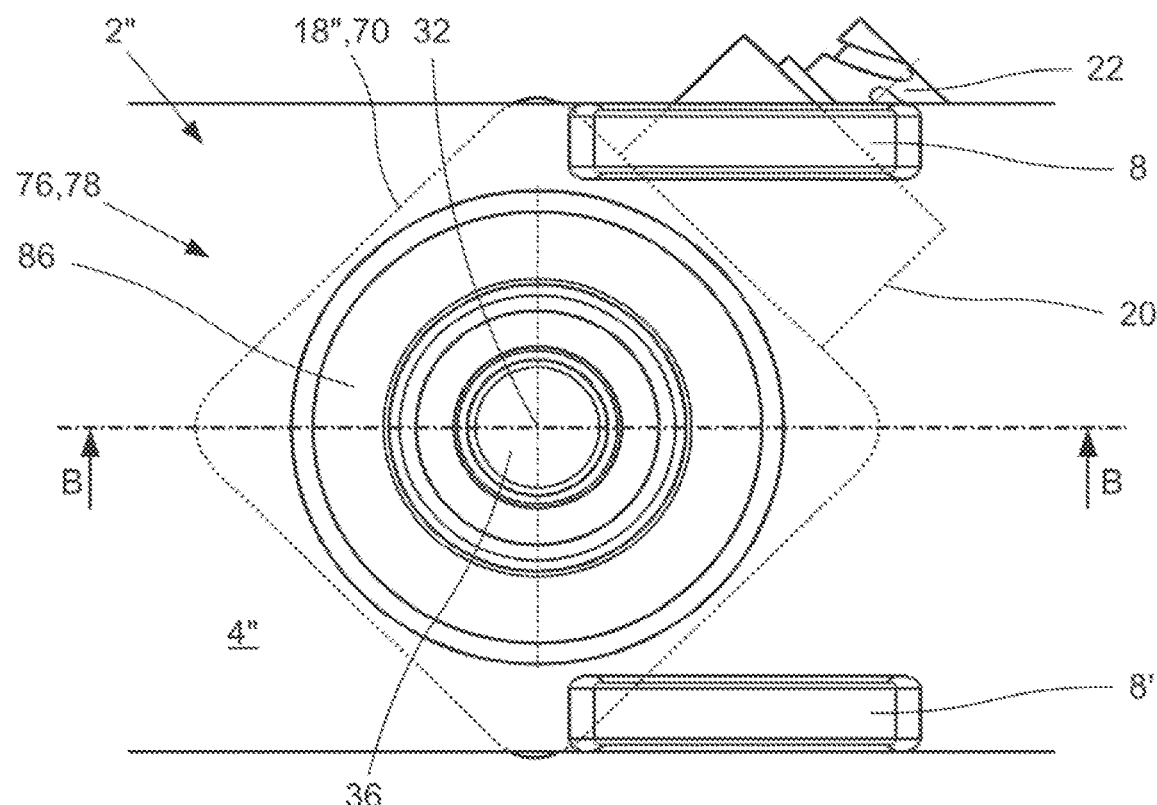
FIG. 2 shows a second embodiment of a foot brake valve according to the invention of a pneumatic brake system in a detail plan view.
Figure 2A:
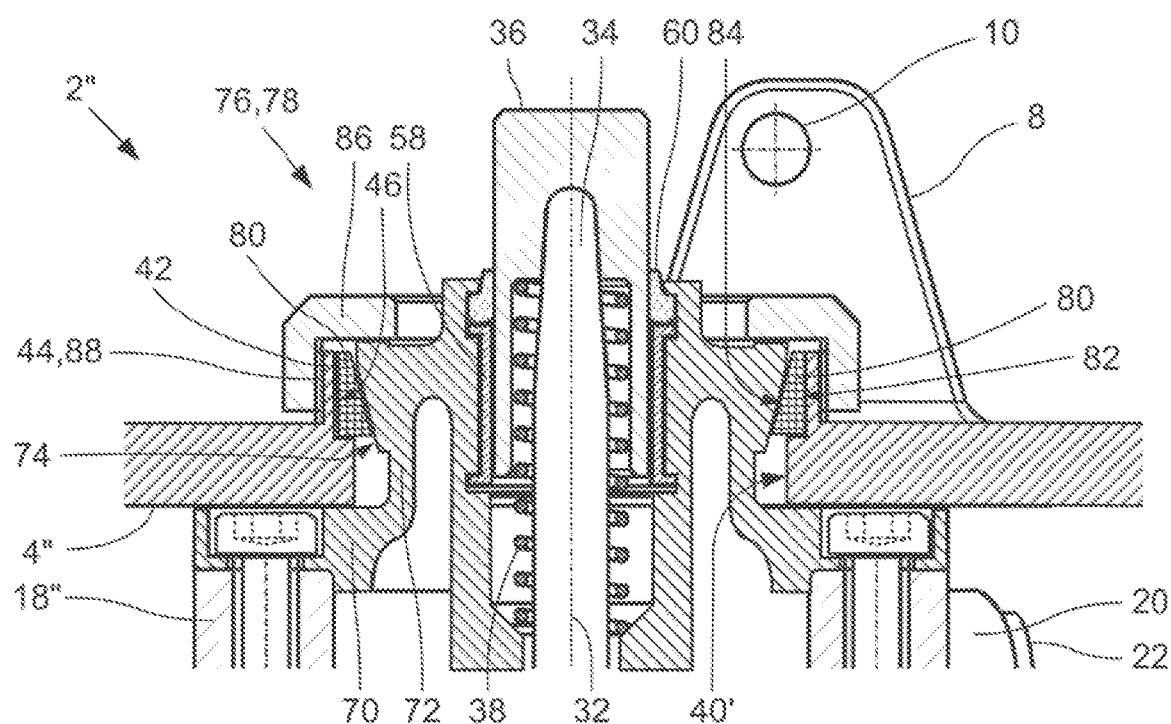
FIG. 2a shows the foot brake valve as per FIG. 2 in a detail longitudinal section.

In a second embodiment of a foot brake valve 2" according to the invention of a pneumatic brake system, as respectively shown in a detail in the plan view as per FIG. 2 and in the longitudinal section of FIG. 2a, which lies in the section plane B-B as per FIG. 2, the housing 18" of the electrical control unit 16 has an intermediate flange 70 which is screw-connected to the main part of the housing 18". The intermediate flange 70 has an annular collar 72 in which the plunger piston 36 is guided in axially movable fashion. For low-friction and sealed guidance of the plunger piston 36, a plain bearing bushing 58 and a sealing ring 60 are inserted into the annular collar 72 of the intermediate flange 70. The intermediate flange 70 is, with the annular collar 72, guided rotatably about the vertical central axis 32 in a passage opening 40' of the installation plate 4" and is connectable in non-positively locking fashion to the installation plate 4" via a releasable clamping connection 76.

The clamping connection 76 is formed by a clamping screw connection 78 which, in summary, has an annular collar 42 on the top side of the installation plate 4" with a cylindrical external thread 44 and with a cylindrical inner wall 46, furthermore a clamping ring 80 with a conical, downwardly narrowing inner wall 84 and with a cylindrical outer wall 82, and a conical outer wall 74 on the annular collar 72 of the intermediate flange 70, and also a sleeve nut 86 with an internal thread 88. The sleeve nut 86 acts, as can be seen, on an axial elevation on the top side of the annular collar 72 of the intermediate flange 70. The clamping ring 80 is, in the installed state, arranged between the inner wall 46 of the annular collar 42 of the installation plate 4" and the outer wall 74 of the annular collar 72 of the intermediate flange 70. As a result of the screw connection of the sleeve nut 86 to the annular collar 42 of the installation plate 4", it is the case that, by way of the annular collar 72 of the intermediate flange 70, radial bracing of the two aforementioned annular collars 42, 72 is effected, as a result of which the intermediate flange 70 is fastened in positively locking and non-positively locking fashion to the installation plate 4'.

The cylindrical inner wall 46 of the annular collar 42 of the installation plate 4", the cylindrical outer wall 82 and the conical inner wall 84 of the clamping ring 80 and also the conical outer wall 74 of the annular collar 72 of the intermediate flange 70 may each optionally be of smooth form or, in particular by a serration, circumferentially toothed form. In this way, when the screw connection of the sleeve nut 86 is loosened, setting of the circumferential orientation of the housings 18", 28 of the control units 16, 26 relative to the installation plate 4" is possible either in continuously variable fashion or with graduation corresponding to the toothing pitch. In the images of FIGS. 2 and 2a, the housings 18", 28 of the control units 16, 26 have, by way of example, been fastened to the installation plate 4" in a manner rotated 45° counterclockwise with respect to the vertical central axis 32 proceeding from a standard setting in which the pneumatic ports p11, p12, p21, p22 and the plug socket 22 are oriented rearward as viewed in a forward direction of travel.

Figure 2B:
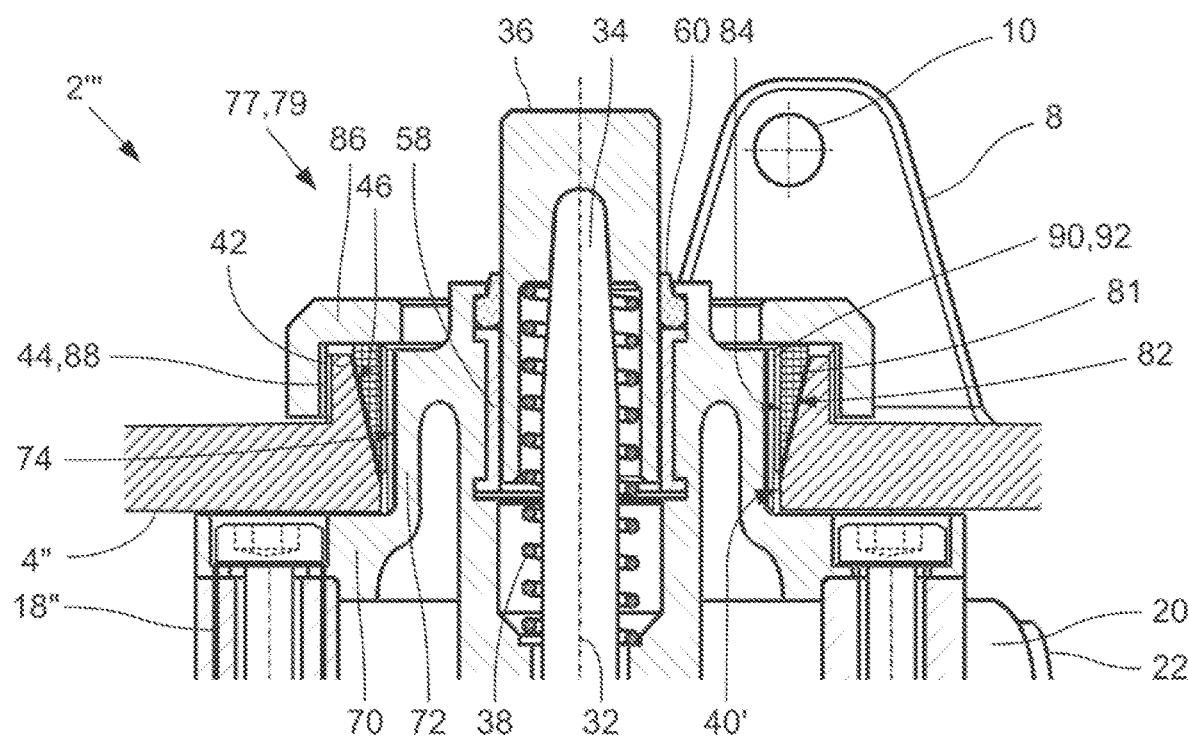
FIG. 2b shows a third embodiment of a foot brake valve according to the invention in a detail longitudinal section.

FIG. 2b shows, in a partial longitudinal section, a third embodiment of a foot brake valve 2‴ which has the features of the invention. In the case of this foot brake valve 2‴, the clamping connection 77 is likewise formed by a clamping screw connection 79. The clamping screw connection 79 has, on the top side of the installation plate 4", an annular collar 42 on which an external thread 44 and a conical, axially downwardly narrowing inner wall 46 is formed. The clamping screw connection 79 furthermore includes a clamping ring 81 with a conical, axially downwardly narrowing outer wall 82 and with a cylindrical inner wall 84. The clamping screw connection 79 furthermore includes a cylindrical outer wall 74 on the annular collar 72 of the intermediate flange 70, and a sleeve nut 86 with an internal thread 88. Furthermore, the clamping screw connection 79 includes an external thread 90 on the annular collar 72 of the intermediate flange 70 and an internal thread 92 on the cylindrical inner wall 84 of the clamping ring 81. The sleeve nut 86 has been screwed onto the annular collar 42 and acts, as can be seen, on the upper end of the clamping ring 81 and on a section, close to the sleeve nut, of the annular collar 72 of the intermediate flange 70.

The stated components interact such that the internal thread 92 of the clamping ring 81 is, in the installed state, screwed together with the external thread 90 of the intermediate flange 70, wherein, as a result of the screw connection of the sleeve nut 86 to the annular collar 42 of the installation plate 4", radial bracing of the two annular collars 42, 72 is effected by way of the clamping ring 80 and the section, close to the sleeve nut, of the annular collar 72 of the intermediate flange 70.

In the case of the foot brake valve 2‴ as per FIG. 2b, the radial inner wall 46 of the annular collar 42 on the top side of the installation plate 4" and the radial outer wall 82 of the clamping ring 80 may each be of smooth form.

In order to achieve an optimum clamping action, it may be provided that the clamping ring 81 is of axially slotted form or is composed of multiple ring segments.

The invention claimed is:

1. A foot brake valve (2') of a pneumatic brake system in a motor vehicle, the foot brake valve comprising:
an installation plate (4', 4"), on which a brake pedal (14) is pivotably mounted and to which a housing (18', 18"; 28) of a control unit (16, 26) is fastened,
a spring-loaded plunger piston (36) in an actuating contact with the brake pedal (14) and guided axially movably in a first annular collar (50, 72), which projects upward out of the installation plate (4', 4"),
wherein the housing (18', 18") of the control unit (16) arranged directly beneath the installation plate (4', 4") has an intermediate flange (48, 70) which is screw-connected to the main part of the housing (18', 18") and which has the first annular collar (50, 72), and wherein the intermediate flange (48, 70) is, with the first annular collar (50, 72), guided in a passage opening (40, 40') of the installation plate (4', 4") coaxially rotatably about a vertical central axis (32), and is connectable in a non-positively locking fashion to the installation plate (4', 4") via a releasable clamping connection (62, 76, 77);
wherein the clamping connection (62) is formed by an outer annular groove (52) with a radially inward groove bottom and an upper side wall in the first annular collar (50) of the intermediate flange (48) and by two clamping plates (64, 64') arranged at the first annular collar (50) diagonally opposite from each other on the installation plate (4') and engaging the annular groove (52),
wherein each of the clamping plates (64, 64') is screw-connected to the installation plate (4') and is angled upward in cross section in a radially inward direction with an axially elevated inner edge (68) and a circular-arc-shaped inner end wall (66), wherein, in an installed state, the circular-arc-shaped inner end wall of each of the clamping plates (64, 64') bears (66) against the groove bottom (54) of the annular groove (52) and the axially elevated inner edge (68) bears against the upper side wall (56) of the annular groove (52).

2. The foot brake valve (2') as claimed in claim 1, wherein the inner end wall (66) of the clamping plates (64, 64') and the groove bottom (54) of the annular groove (52) of the first annular collar (50) are both smooth.

3. The foot brake valve (2') as claimed in claim 1, wherein the inner end wall (66) of the clamping plates (64, 64') and the groove bottom (54) of the annular groove (52) of the first annular collar (50) are both circumferentially toothed.

4. The foot brake valve (2') as claimed in claim 3, wherein both the inner end wall (66) of the clamping plates (64, 64') and the groove bottom (54) of the annular groove (52) of the first annular collar (50) have a circumferential serration.

5. A foot brake valve (2") of a pneumatic brake system in a motor vehicle, the foot brake valve comprising:
an installation plate (4', 4"), on which a brake pedal (14) is pivotably mounted and to which a housing (18', 18"; 28) of a control unit (16, 26) is fastened,
a spring-loaded plunger piston (36) in an actuating contact with the brake pedal (14) and guided axially movably in a first annular collar (50, 72), which projects upward out of the installation plate (4', 4"),
wherein the housing (18', 18") of the control unit (16) arranged directly beneath the installation plate (4', 4")

has an intermediate flange (48, 70) which is screw-connected to the main part of the housing (18', 18") and which has the first annular collar (50, 72), and wherein the intermediate flange (48, 70) is, with the first annular collar (50, 72), guided in a passage opening (40, 40') of the installation plate (4', 4") coaxially rotatably about a vertical central axis (32), and is connectable in a non-positively locking fashion to the installation plate (4', 4") via a releasable clamping connection (62, 76, 77);

wherein the clamping connection (76) is formed by a clamping screw connection (78) which comprises the following:

a second annular collar (42) on the top side of the installation plate (4") with a cylindrical inner wall (46), a clamping ring (80) with a cylindrical outer wall (82) and with a conical, axially downwardly narrowing inner wall (84), and a conical outer wall (74) on the first annular collar (72) of the intermediate flange (70), and a sleeve nut (86) with an internal thread (88), wherein the clamping ring (80) is, in an installed state, arranged between the cylindrical inner wall (46) of the second annular collar (42) of the installation plate (4") and the conical outer wall (74) of the first annular collar (72) of the intermediate flange (70), and wherein radial bracing of the first and second annular collars (42, 72) is caused by the clamping ring (80) as a result of the screw connection of the sleeve nut (86) to the second annular collar (42) of the installation plate (4").

6. The foot brake valve (2") as claimed in claim 5, wherein the cylindrical inner wall (46) of the second annular collar (42) of the installation plate (4"), the conical inner wall (84) and the cylindrical outer wall (82) of the clamping ring (80), and the conical outer wall (74) of the first annular collar (72) of the intermediate flange (70) are each of smooth form.

7. The foot brake valve (2") as claimed in claim 6, wherein the clamping ring (80) is axially slotted or is composed of multiple ring segments.

8. The foot brake valve (2") as claimed in claim 5, wherein the cylindrical inner wall (46) of the second annular collar (42) of the installation plate (4"), the conical inner wall (84) and the cylindrical outer wall (82) of the clamping ring (80) and the conical outer wall (74) of the first annular collar (72) of the intermediate flange (70) are each of circumferentially toothed form.

9. The foot brake valve (2") as claimed in claim 8, wherein the cylindrical inner wall (46) of the second annular collar (42) of the installation plate (4"), the conical inner wall (84) and the cylindrical outer wall (82) of the clamping ring (80) and the conical outer wall (74) of the first annular collar (72) of the intermediate flange (70) are each provided with a circumferential serration.

10. The foot brake valve (2") as claimed in claim 9, wherein the clamping ring (80) is axially slotted or is composed of multiple ring segments.

11. The foot brake valve (2") as claimed in claim 8, wherein the clamping ring (80) is axially slotted or is composed of multiple ring segments.

12. The foot brake valve (2") as claimed in claim 5, wherein the clamping ring (80) is axially slotted or is composed of multiple ring segments.

13. A foot brake valve (2'") of a pneumatic brake system in a motor vehicle, the foot brake valve comprising:

an installation plate (4', 4"), on which a brake pedal (14) is pivotably mounted and to which a housing (18', 18"; 28) of a control unit (16, 26) is fastened, a spring-loaded plunger piston (36) in an actuating contact with the brake pedal (14) and guided axially movably in a first annular collar (50, 72), which projects upward out of the installation plate (4', 4"), wherein the housing (18', 18") of the control unit (16) arranged directly beneath the installation plate (4', 4") has an intermediate flange (48, 70) which is screw-connected to the main part of the housing (18', 18") and which has the first annular collar (50, 72), and wherein the intermediate flange (48, 70) is, with the first annular collar (50, 72), guided in a passage opening (40, 40') of the installation plate (4', 4") coaxially rotatably about a vertical central axis (32), and is connectable in a non-positively locking fashion to the installation plate (4', 4") via a releasable clamping connection (62, 76, 77);

wherein the clamping connection (77) is formed by a clamping screw connection (79) which comprises the following:

a second annular collar (42) on a top side of the installation plate (4") with an external thread (44) and with a conical, axially downwardly narrowing inner wall (46), a clamping ring (81) with a conical, axially downwardly narrowing outer wall (82) and with a cylindrical inner wall (84), a cylindrical outer wall (74) on the first annular collar (72) of the intermediate flange (70), and a sleeve nut (86) with an internal thread (88), an external thread (90) on the first annular collar (72) of the intermediate flange (70), and an internal thread (92) on the inner wall (84) of the clamping ring (81), wherein the internal thread (92) of the clamping ring (81) is, in an installed state, screw-connected to the external thread (90) of the intermediate flange (70), and wherein radial bracing of the first and second annular collars (42, 72) is caused by the clamping ring (80) as a result of a screw connection of the sleeve nut (86) to the second annular collar (42) of the installation plate (4").

14. The foot brake valve (2'") as claimed in claim 13, wherein both the inner wall (46) of the second annular collar (42) on the installation plate (4") and the outer wall (82) of the clamping ring (81) are smooth.

15. The foot brake valve (2'") as claimed in claim 14, wherein the clamping ring (81) is axially slotted or is composed of multiple ring segments.

16. The foot brake valve (2'") as claimed in claim 13, wherein the clamping ring (81) is axially slotted or is composed of multiple ring segments.

\* \* \* \* \*